United States Patent [19]
Selfridge et al.

[11] Patent Number: 5,388,188
[45] Date of Patent: Feb. 7, 1995

[54] APPARATUS AND METHODS FOR PROVIDING DESIGN ADVICE

[75] Inventors: Peter G. Selfridge, Cranford; Loren G. Terveen, Hampton, both of N.J.

[73] Assignee: AT&T Corp., Murray Hill, N.J.

[21] Appl. No.: 852,596

[22] Filed: Mar. 17, 1992

[51] Int. Cl.⁶ ...................... G06F 15/40; G06F 15/60
[52] U.S. Cl. ........................................ 395/50; 395/919
[58] Field of Search ................ 364/512; 395/919, 921, 395/50

[56] References Cited

U.S. PATENT DOCUMENTS 5,208,768  5/1993  Simoudis ........................... 395/919

OTHER PUBLICATIONS

"Readings in Knowledge Representation", edited by Ronald J. Brachman and Hector J. Levesque, Morgan-Kauffmann, 1985.

"Report on DARPA-Sponsored Workshop on Design", edited by Saul Amarel, Technical Report No. LCSR-TR-160, Dept. of Computer Science, Rutgers University, Apr. 1991.

L. A. Resnick, "The CLASSIC User's Manual", AT&T Bell Laboratories Technical Report, 1991.

R. J. Brachman, A. Borgida, D. L. McGuinness, P. F. Patel-Schneider and L. A. Resnick, "Living with Classic: When and How to Use a KL-ONE-Like Language", J. Sowa, ed., in *Principles of Semantic Networks: Explorations in the Representation of Knowledge;* Morgan-Kauffmann, 1991, pp. 401–456.

Evaulating Design Using Knowledge of Purpose and Knowledge of Structure; Bradshaw et al; IEEE Expert; Apr. 1991; pp. 33–40.

A Design Plan Knowledge Acquisition Support System for Knowledge-Based Design System; Iwane et al; IEEE Pacific Rim Conf. on Communications, Computers and Signal Processing; 9–10 May 1991; pp. 376–379.

Feature-Based Design Evaluation Through Constraint Structure Unification; Godden; Proc. of the 1991 IEEE Int. Conf. on Tools for AI; Nov. 1991; pp. 119–124.

B. J. Vivier, et al. "Annotator: An IA Approach to Engineering Drawing Annotation", Proceedings of 1st Intl. Conf. on Industrial and Engineering Applications of Artificial Intelligence and Expert Systems, Jun. 1, 1988, New York, ACM, pp 447–455.

M. Klein, "Supporting Conflict Resolution in Cooperative Design Systems", IEEE *Transactions on Systems, Man and Cybernetics,* vol. 21, No. 6, Nov. 1991, New York.

Agrawal, R., Ghosh, S. Imielinski, T., Iyer, B., and Swami, A., "An Interval Classifier for Database Mining Applications", Proceedings of the 18th VLDB Conference, Vancouver, British Columbia, Canada 1992.

Anand, T., and Kahn, G., "Making Sense of Gigabytes: A System for Knowledge-Based Market Analysis",

(List continued on next page.)

*Primary Examiner*—Robert W. Downs
*Attorney, Agent, or Firm*—Gordon E. Nelson

[57] ABSTRACT

A knowledge-based artificial intelligence system which provides design advice. The artificial intelligence system includes a knowledge base of design information. Users of the system indicate an area about which they require design advice. The system provides the relevant advice. Included in the advice is an indication of the "owner" of the advice. The advice and the relationship between the design made by the user are part of a trace of the users' session with the system. The trace becomes part of a design document for the design. When the design is reviewed, the trace is reviewed as well. The system includes an interface for updating the knowledge base, and if the design review indicates a need to correct the knowledge base, the corrections are made using the interface for updating. A preferred embodiment of the system is used to provide advice to designers of a large software system concerning the use of an error reporting and handling system in the system being designed.

9 Claims, 6 Drawing Sheets

OTHER PUBLICATIONS

Proc. of AAAI Conference on Innovative Applications of AI, San Jose, Calif., Jul. 1992.

Anwar, T. M., Navathe, S. B., and Beck, H. W., "Knowledge Mining in Databases: A Unified Approach Through Conceptual Clustering" submitted for publication.

Anwar, T. M. Beck, H. W., and Navathe, S. B., "Knowledge Mining by Imprecise Querying: A Classification-Based Approach", Proceedings of the 8th Int'l. Conference on Data Engineering, Tempe, Arizona, Feb. 3–7, 1992, pp. 622–630.

Dhar, V. and Tuzhilin, A., "Abstract-Driven Pattern Discovery in Databases, Center for Research on Information Systems,", NYU, Working Paper Series STERM IS-92-11, Mar., 1992.

Frawley, W. J., Piatetsky-Shapiro, G., and Matheus, C. J., "Knowledge Discovery in Databases: An Overview", Knowledge Discovery in Databases, AAAI Press, 1991.

Klosgen, W., "Problems for Knowledge Discovery in Databases and Their Treatment in the Statistics Interpreter Explora", International Journal of Intelligent Systems 7:649–673, 1992.

Piatetsky-Shapiro, G., and Matheus, C. J., "Knowledge Discovery Workbench for Exploring Business Databases", International Journal of Intelligent Systems 7:675–686, 1992.

Anand, T., and G. Kahn, "SPOTLIGHT: A Data Explanation System", Proceedings of the 8th IEEE Conference on AI for Applications, Monterey, Calif., Mar. 1992.

AN UNDERLINED ADVICE ITEM
INDICATES THAT IT IS OVERRIDING

FIG. 3

ALGORITHM GET-DESIGNER-TO-CLASSIFY-DESIGN - Version 1

This version is appropriate for very small description hierarchies, say with fewer than 10 leaf nodes.

1. For each *leaf node* $D_L$ in the hierarchy of Design Descriptions, retrieve the *establishing question* EQ for $D_L$. (EQ is a piece of natural language text that asks a yes-no question.)

2. Present EQ to the designer. The designer must answer yes or no.

3. IF the designer answers yes, then

- the Description $D_L$ describes the design D.

- Use algorithm COMPUTE-ADVICE (shown in Figure 3) to compute the advice relevant to $D_L$.

- Present the advice to the designer.

- Create a trace of the interaction, to appear as part of the Annotated Design Document 106.

FIG. 4

ALGORITHM GET-DESIGNER-TO-CLASSIFY-DESIGN - Version 2

1. Initialize $D_{Current}$ to NULL.

2. Initialize $D_{Possible}$ to be a set containing only the *root node* $D_R$ of the hierarchy of Design Descriptions.

3. For each description $D_P$ in $D_{Possible}$, retrieve the *establishing question* EQ for $D_P$ 4. Present each EQ to the designer.

5. The designer may select at most one $D_P$ as describing the design D.

6. IF the designer selects a $D_P$ from $D_{Possible}$, then

- the Description $D_P$ (a specialization of $D_{Current}$) describes the design D.

- IF $D_P$ is a leaf node, then

- Use algorithm COMPUTE-ADVICE (shown in Figure 3) to compute the advice relevant to $D_P$.

- Present the advice to the designer.

- Create a trace of the interaction, to appear as part of the Annotated Design Document 106.

- ELSE ($D_P$ is not a leaf node)

- Set $D_{Current}$ to be $D_P$.

- Set $D_{Possible}$ to be the children of $D_{Current}$.

- GOTO step 3.

7. ELSE (none of the descriptions in $D_{Possible}$ describe the design D)

- IF $D_{Current} \neq$ NULL, THEN

- Use algorithm COMPUTE-ADVICE (shown in Figure 3) to compute the advice relevant to $D_{Current}$.

- Present the advice to the designer.

- Create a trace of the interaction, to appear as part of the Annotated Design Document 106.

FIG. 5

ALGORITHM COMPUTE-ADVICE ($D_{oscr}$)

1. Initialize Current-Description to $D_{oscr}$; initialize ADVICE to the empty set.

2. Set DC to the set of decisions indexed by Current-Description.

3. For each decision $DC_i$ in DC,

- For each Advice Items $AI_{i,j}$ indexed by $DC_i$

- Unless there already is an Advice-Item $AI_{MSP}$ in ADVICE such that

- $AI_{MSP}$ is indexed by $DC_i$ AND

- $AI_{MSP}$ is labeled as *overriding* add $AI_{i,j}$ to ADVICE.

4. IF Current-Description has a parent description, THEN

- set Current-Description be the parent of Current-Description.

- GOTO step 2.

5. Sort the advice items in ADVICE so that all the advice items labeled *primary* come before all those labeled *secondary*.

Notice that step 3 ensures that if an advice item is labeled as *overriding*, any advice items for the same decision indexed by descriptions higher in the description hierarchy will not appear as part of the advice. This is because the algorithm COMPUTE-ADVICE considers descriptions from most specific (lowest in the hierarchy) to least specific (highest in the hierarchy).

DKT PROBLEM QUESTION:
In your design, do you deal with situations where parameters passed to functions are processed and their bounds checked?   *603*

USER RESPONSE: yes

You should consider an Assert for a situation of this kind. Here is some advice that should be followed if you choose to assert:

PRIMARY ADVICE:
    DATA TO DUMP:    Explicitly dump the parameters only if they are indirect (pointers) - like message ids and message structure pointers.   *607*
    ESCALATION:    Never escalate.
    MACRO TO USE:    Almost certainly use Assert macro B1, B2, or B3 (But see 'ASSERT C USE' below).
    RECOVERY ACTION:    Use an RPI (Return to Point of Sender), unless this error condition is unrecoverable. In this case, use an SPP (Single Process Purge).
    AUDIT:    Do not schedule an audit.

SECONDARY ADVICE:
    ASSERT C USE:    In very rare circumstances, a running process other than the current process should be purged. Use assert macro C if this applies.   *605*
    DUMPING ENOUGH DATA:    It is very important to dump all the pieces of data to debug and solve the problem you are asserting for.
    LIMIT ROP OUTPUT:    ROP output is somewhat important; all other things considered, it should be minimized.
    MACRO DATA INFORMATION:    Use of the macros B1, B2 or B3 depends on the amount of data you want to dump. Macro B1 will dump 1 buffer of 160 bytes. Macro B2 will dump 2 buffers of 160 bytes. Macro B3 will dump 3 buffers of 160 bytes.   *609*
    PACKING DATA:    If appropriate, pack the data for output. This will also impact your choice of macro. For example, if you want to dump 3 integers, you can pack them together and use macro B1. If you have 3 structures, however, consider dumping them each independently with macro B3.

APPARATUS AND METHODS FOR PROVIDING DESIGN ADVICE

BACKGROUND OF THE INVENTION

1. Field of the Invention

This invention relates to information systems that produce advice about a design domain in order to help someone designing in the domain. Such systems produce advice by using a "knowledge base" in which information relevant to designing in the domain is stored. Typical domains include the design of software, integrated circuits, mechanical devices, and buildings.

2. Description of the Prior Art

Knowledge-based technology is central to the field of Artificial Intelligence and various application areas that evolved from it (*Readings in Knowledge Representation*, edited by Ronald J. Brachman and Hector J. Levesque, Morgan-Kauffmann, 1985). This technology has three facets. First are techniques for representing knowledge about the domain (such as configuring computer components) in a computer. Issues of succinctness and completeness arise in the representation of domain knowledge. The second facet is access, techniques for presenting and making accessible appropriate knowledge at appropriate times. The third facet can be called update, maintenance, or evolution; it involves the ability to change the knowledge in response to new or unanticipated conditions in the domain. Note that how the knowledge is represented can greatly impact the second and third facets of knowledge-based technology.

An important application area for knowledge-based technology is the area of design (*Report on DARPA-Sponsored Workshop on Design*, edited by Saul Amarel, Technical Report no. LCSR-TR-160, Department of Computer Science, Rutgers University, April, 1991). Design is an important engineering activity where objects and artifacts are either designed from scratch or modified (re-design); these objects and artifacts can be physical objects (integrated circuits, bridges), non-physical objects (software, software systems), or even processes (for chemical engineering, manufacturing). The process of design usually involves or results in external representations of the objects and artifacts, such as blueprints, scale models, or block diagrams. Design is very knowledge-intensive: it requires knowledge of the engineering domain, relevant problem-solving knowledge, common sense knowledge, and knowledge of the tools and techniques for external representation. It is very often the case that a large part of the required body of knowledge is only available in the heads of experts in the area and is not written down in any comprehensive fashion. This makes it difficult for novices in the area, or experts unfamiliar with a sub-domain, to locate, understand, and apply design knowledge relevant to a particular design situation.

New technology has resulted in automation of some parts of engineering design, in particular, computer-based graphics workstations for accessing and manipulating the artifacts of design. However, very little work has been done in actually assisting the design process by providing access to design knowledge. Such knowledge remains as organizational "folklore", or represented in voluminous documents which only provide a primitive indexing ability. An alternative approach, the subject of this patent, is to codify design knowledge in a knowledge base and, equally important, provide mechanisms for a user to access that knowledge at relevant portions of the design process and provide mechanisms for the maintenance of the knowledge in the knowledge base.

Assuming the viability of such an approach, a number of important benefits will result. First of all, the availability of appropriate design knowledge will improve the design process and produce superior designs. Second, the codification of design knowledge will allow that knowledge to be efficiently disseminated and re-used, again improving the overall design process within an organization. Third, if a mechanism of updating the design knowledge, also called knowledge maintenance, can be integrated in an organization, this knowledge will remain current and relevant as design situations change.

This latter issue of knowledge maintenance is particularly critical in design. Unlike medical diagnosis or computer configuration domains, the body of relevant design knowledge is both harder to "get right" initially and will change because of changing engineering standards and practices and organizational changes. In addition, the engineering design process is often a process of re-design of existing design objects, and thus is very dependent on the changing state of those objects. This further increases the importance of knowledge maintenance.

One recent organizational development that can ease the maintenance problem is the so-called "quality revolution" in commerce and industry. This movement emphasizes a variety of organizational changes resulting in the notion of an organizational process. Each organizational process can be viewed as discreet unit with a number of inputs (customer requests), outputs (organizational products), and various feedback loops which can be used to evaluate the effectiveness of the process. A process can be further divided, in a hierarchical fashion, into sub-processes. One of the many benefits of this viewpoint is that a process or sub-process can have an owner designated, providing a single point of contact for evaluating and modifying the process. The idea of organizational process can be used to address the problem of maintenance of a design knowledge base if the maintenance problem can be integrated into a new or existing organizational process.

SUMMARY OF THE INVENTION

The above object is achieved by apparatus for producing advice about a design and for annotating designs with the advice produced. Advice is information about the design domain relevant and useful to the design. The apparatus includes
- a design document;
- a knowledge base for producing information relevant to designing in a particular domain;
- means for a designer to request access to the information in the knowledge base;
- means for the system to assemble advice in response to the designer's request;
- means for identifying the "owner" of each piece of information in the knowledge base; and
- means to annotate designs with a trace of the advisory interaction, including system questions, user responses, and system advice.

It is an object of the invention to provide designers with improved access to information.

It is a further object of the invention to support the ongoing evolution of the information in the knowledge base, as new knowledge is generated and as the information already in the knowledge base is found inadequate.

It is an additional object of the invention to support and focus communication among designers, both decreasing the need for communication, and, when communication still is required, ensuring that it occurs directly between a designer who needs help and a designer who can give the help.

These and other objects and advantages of the invention will be apparent to those of ordinary skill in the art after perusing the Detailed Description and Drawing, wherein:

BRIEF DESCRIPTION OF THE DRAWING

FIG. 6 illustrates a partial trace of an interaction with an application of the apparatus and methods applied to the domain of software design.

DETAILED DESCRIPTION

The following Detailed Description begins with an overview of the invention and then proceeds to a detailed description of a preferred embodiment thereof.

Figure 1:
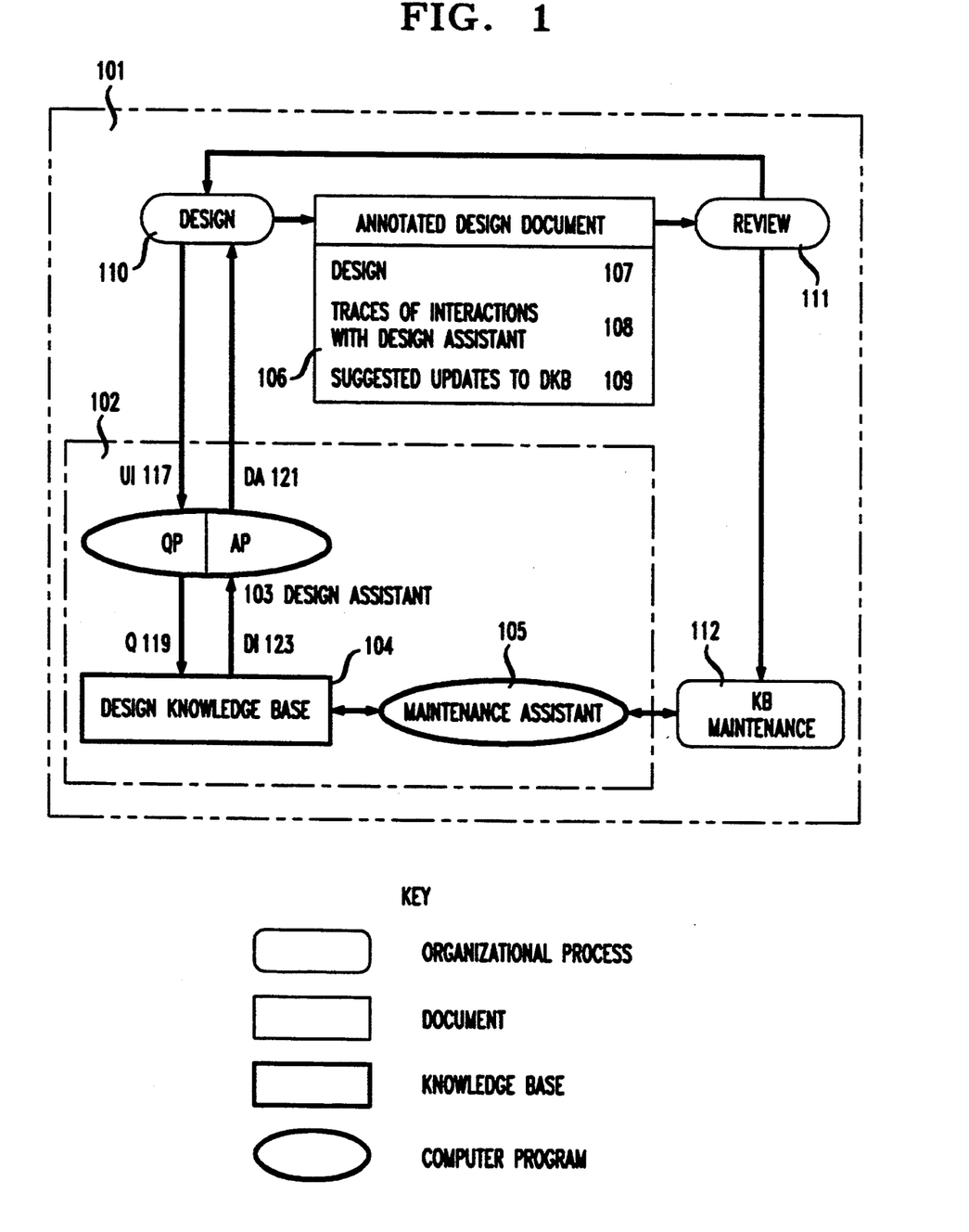
FIG. 1 illustrates the overall structure of the invention; it includes the principal components of each of the mechanisms in the embodiment and how the mechanisms are employed in the design process.

Overview of the Invention: FIG. 1

FIG. 1 shows an artificial intelligence system 102 embedded in a larger design process 101. The artificial intelligence system includes a knowledge base of design information and is implemented using the present invention. The major components are the following:

- Design Knowledge Base (DKB) 104 contains the information about designing in a particular domain used to produce design advice;
- Design Assistant 103 is a computer program that interacts with a designer to give the designer access to relevant information from DKB 104. Design Assistant 103 consists of two parts, a Query Provider QP and an Advice Provider AP.
- Maintenance Assistant 105 is a computer program that interacts with a knowledge base maintainer to add new information to DKB 104;
- The Annotated Design Document 106 consists of three parts:
    Design 107—a specification of the product to be built;
    Trace of interactions with the Design Assistant 108—shows the advice given by Design Assistant 103, in particular, the features of the Design 107 due to advice produced from DKB 104;
    Suggested updates to Design Knowledge Base 109—information that a designer believes should be added to DKB 104.

The operation of system 102 within the organizational process 101 is as follows. While constructing a Design 107, a designer interacts with the Query Provider QP part of Design Assistant 103 by providing user input UI 117. On the basis of this interaction, Design Assistant 103 queries DKB 104 with Query 119 to access design information relevant to the designer. The DKB 104 provides Design Information DI 123 to the Design Assistant 103. The Advice Provider AP part of the Design Assistant presents the relevant information as Design Advice DA 121 to the designer as advice. Each item in the advice is labeled with the "owner" of the advice. This advice becomes an annotation 108 to the Annotated Design Document 106. In addition, designers may suggest additions to or modifications of DKB 104 where they believe it to be incomplete or incorrect. These suggestions 109 also become part of the Annotated Design Document 106.

The Annotated Design Document 106 is then subject to a Review 111. The Review 111 is a meeting in which a group of experienced designers in the relevant domain examine the Annotated Design Document 106 to look for problems with the design. The presence of the trace of design advice 108 and suggested updates to the knowledge base 109 is crucial in supporting the evolution of DKB 104. The trace 108 makes problems in the design due to advice based on incorrect information in DKB 104 apparent. The suggested updates 109 also are judged to see if they are consistent with the reviewers' knowledge and may be extended or modified based on the reviewers' examination of the Annotated Design Document 106.

After the Review 111, the Annotated Design Document 106 is given to a human knowledge base maintainer. The process of KB Maintenance 112 involves the knowledge base maintainer interacting with a Maintenance Assistant program 105 to update DKB 104 based on the modifications and additions discovered to be necessary during Design 110 and Review 111 and recorded on the Annotated Design Document 106. For each update of the knowledge base, the person who suggested that update (the "owner") is associated with the new item in the knowledge base.

DETAILED DESCRIPTION OF THE STRUCTURE AND OPERATION OF THE INVENTION

Figure 2:
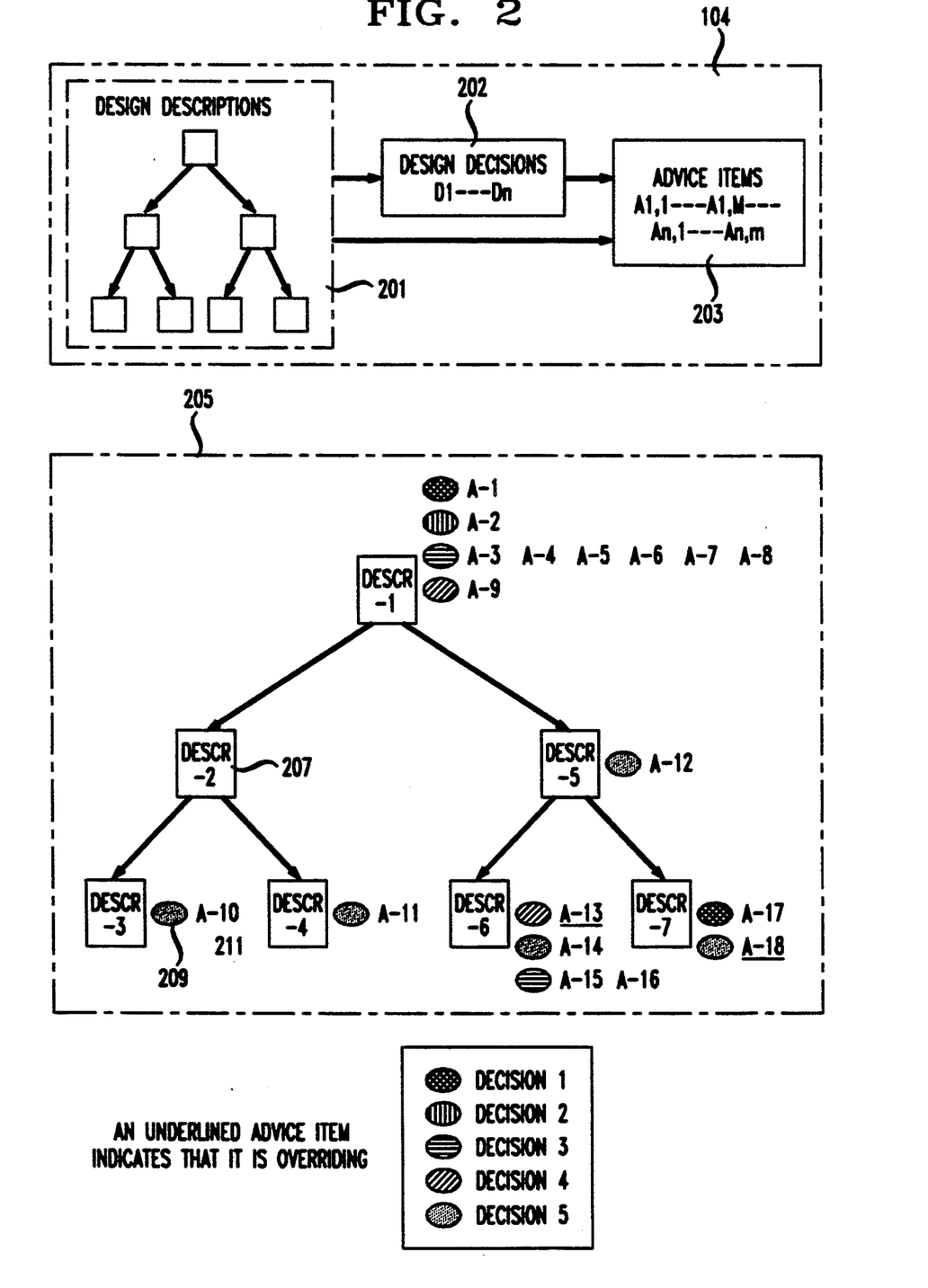
FIG. 2 illustrates the structure of the knowledge base in a preferred embodiment.

We first describe the organization of information in the Design Knowledge Base (DKB) 104. The DKB 104 must contain information that is relevant to the task of designing in a particular domain. The combination of the organization of information in DKB 104 and the working of the Design Assistant 103 must allow designers easy access to relevant design information. In a preferred embodiment, the DKB 104 contains the following major components (see FIG. 2):

- A hierarchy of Design Descriptions 201; in the area of software design, for example, Design Descriptions might include "Designs that consume too many resources" and "Designs that send too many messages"; the second Description would be a specialization of the first;
- A set of Design Decisions 202, indexed by Design Description; in the area of software design, for example, a Design Description might be "Should I define a new process or use an existing process?"; and
- A set of Advice Items 203, indexed by Design Description and Design Decision.

The meaning of these components is as follows:
IF a Description $D_{escr}$ is determined to be true of a design D,
AND $D_{escr}$ indexes the Decisions $D_1, \ldots, D_N$, AND each $<D_{escr}, D_i>$ pair ($1 \leq i < N$) indexes the Advice Items $A_{i,1} \ldots A_{i,M}$ THEN the advice items $A_{1,1}, \ldots, A_{1,M}, \ldots, A_{N,1}, \ldots, A_{N,M}$ are relevant to the design D.

There are three additional aspects to the representation of design information:

Advice items are labeled as either primary or secondary;

Advice items may be labeled as overriding; and

Design Descriptions have an associated establishing question.

The use of this information is discussed below.

In a preferred embodiment, we use CLASSIC (L. A. Resnick, "The CLASSIC User's Manual", *AT&T Bell Laboratories Technical Report*, 1991; R. J. Brachman, A. Borgida, D. L. McGuinness, P. F. Patel-Schneider, and L. A. Resnick, "Living with Classic: How and When to Use a KL-One-like Language", in J.Sowa, ed., *Principles of Semantic Networks: Explorations in the Representation of Knowledge*; Morgan-Kauffmann, 1991, pp. 401–456.) as the language for representing the design information described above. The abstract, pictorial presentations of design information shown in FIG. 2 are realized in CLASSIC as follows:

each Design Description 201 is a CLASSIC concept;

the CLASSIC relationships parent and child are used to represent the hierarchy;

each Design Decision 202 also is a CLASSIC concept;

each Advice Item 203 is a CLASSIC individual;

the index relationships among Design Descriptions, Design Decisions, and Advice Items are represented by CLASSIC roles, which simply are a means for stating a relationship between two objects; and roles also are used to represent the additional features of the representation identified above: primary vs. secondary, overriding, and establishing questions.

FIG. 2 also contains an example showing more precisely how Design Descriptions 201, Design Decisions 202, and Advice Items 203 are related. In the example, the nodes in the tree 205 indicate Design Descriptions 207, ovals 209 indicate Design Decisions, and text of the form "A-N" 211 indicates an Advice Item. The indexing relationship is shown informally, by the position of Descriptions, Decisions, and Advice Items. Relationships shown in the example include Descr-1 indexes Decision 1;

<Descr-1, Decision 1> indexes A-1;

Descr-6 indexes Decision 3, Decision 4, and Decision 5; and:

<Descr-6, Decision 3> indexes A-15 and A-16.

We next discuss the interaction of the Design Assistant 103 with a designer, illustrating how the interaction gives the Design Assistant 103 sufficient information to access relevant information in the Design Knowledge Base 104; and how the Design Assistant 103 computes advice based on the interaction with the designer.

Figure 3:
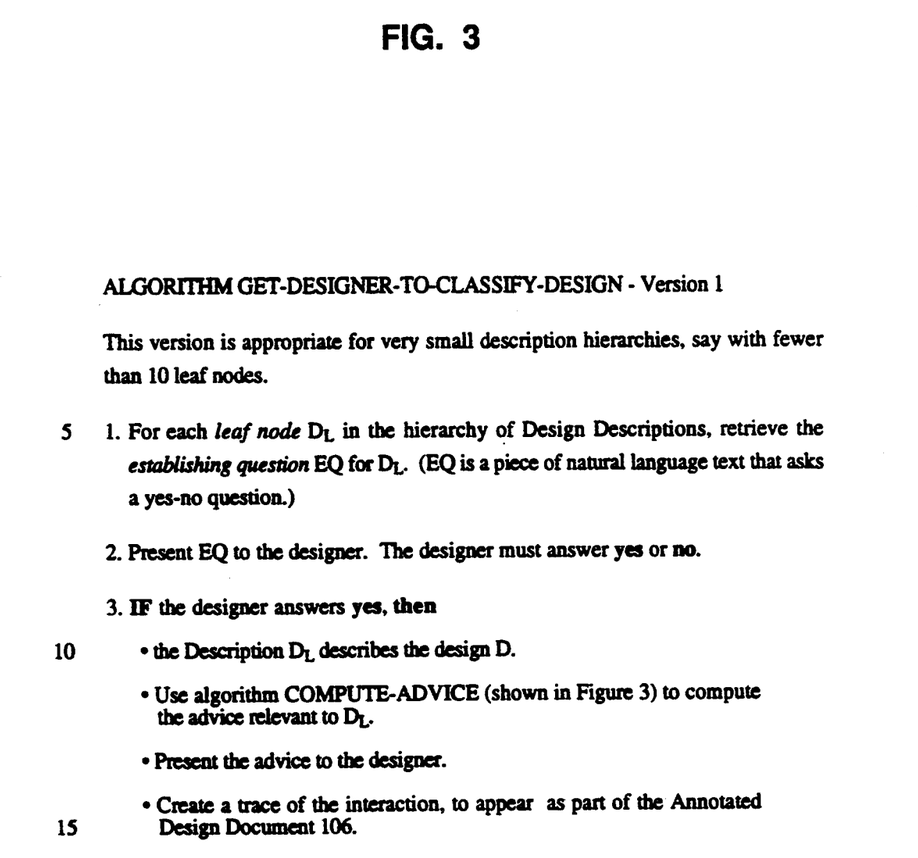
FIGS. 3 and 4, illustrate two methods of interacting with a designer to obtain input required to access relevant information in the knowledge base.
Figure 4:
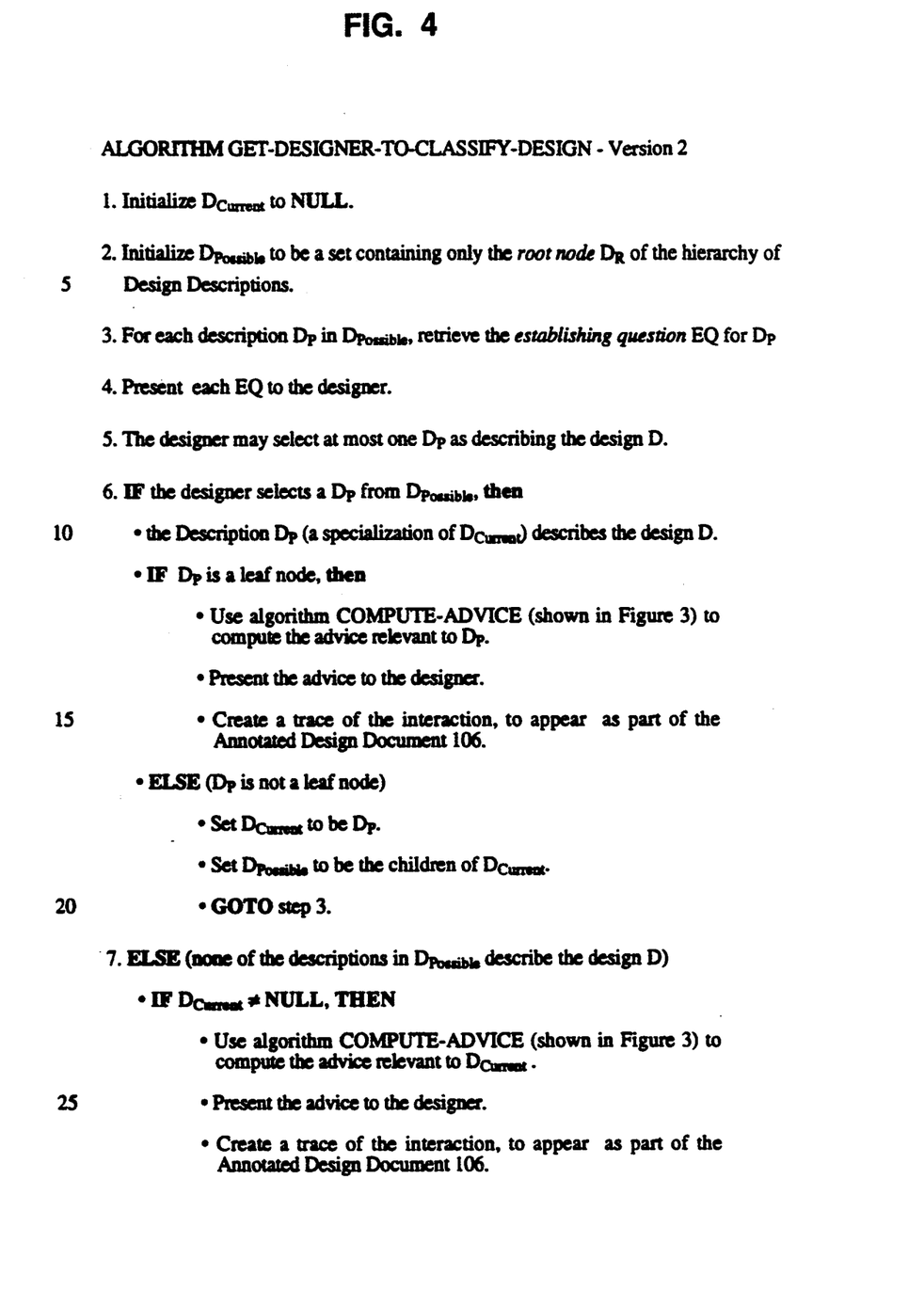

The goal of the interaction is to get the designer to classify his or her design under the most specific relevant Design Description; this results in the most specific possible advice. We describe two preferred embodiments for engaging n such an interaction with the designer. The first embodiment, given in FIG. 3, is preferable for very small description hierarchies; the second embodiment, given in FIG. 4, is preferable for all larger hierarchies. We call the algorithm GET-DESIGNER-TO-CLASSIFY-DESIGN. Note that the hierarchical representation of Design Descriptions allows for an economical representation of advice; advice common to a number of Descriptions can be represented at a common parent Description. Exceptions to this general advice can be labeled as being overriding. Overriding advice cancels out or overrides more general advice and replaces the general advice when the advice is presented. For example, in FIG. 2, Advice Item A-13 overrides Advice Item A-12, and Advice Item A-18 overrides Advice Item A-18. If Description Desc-6 is found to be relevant, Advice Item A-13 would be presented to the user and Advice Item A-9, which relates to the save Design Decision, would not be presented. Likewise, if Description D7 was found to be relevant, Advice Item A-18 would be presented to the user and Advice Item A-12 would not be.

Figure 5:
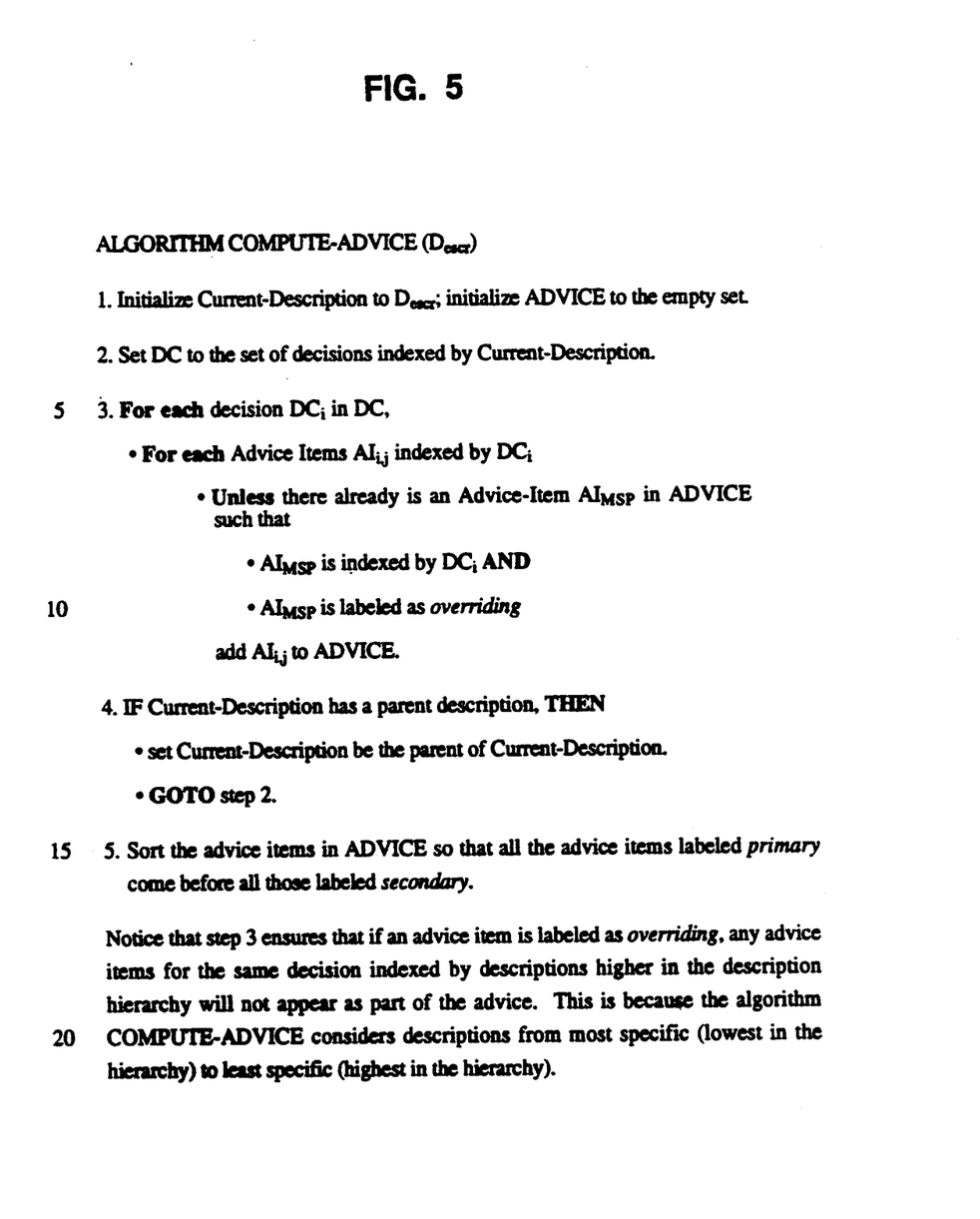
FIG. 5 illustrates the process of computing advice in a preferred embodiment.

After obtaining this information from the designer, the Design Assistant 103, uses algorithm COMPUTE-ADVICE (shown in FIG. 5) to compute the advice that is relevant to the design being constructed. In addition to presenting the advice to the designer, the Design Assistant also produces a trace of the advisory interaction, including the advice produced. This trace 108 then becomes part of the Annotated Design Document 106.

The Annotated Design Document 106 then is examined in the Review 111. In particular, the parts of the design due to the advice generated from the DKB 104 will be examined. Any modifications of or additions to the information in the DKB 104 detected during the Design 110 and Review 111 processes will be examined by a knowledge base maintainer. During the process of KB Maintenance 112, the knowledge base maintainer will use the Maintenance Assistant program 105 to integrate these modifications and additions into the DKB 104.

APPLICATION OF THE TECHNIQUES TO SOFTWARE DESIGN

The described apparatus and methods for providing design advice have been applied to the domain of software design. The specific domain is the use and a particular error reporting and handling mechanism that is used in a software program.

A hierarchy of design descriptions relevant to this error reporting mechanism has been represented in a knowledge base. A set of design decisions relevant to the above mentioned error mechanism have been represented and indexed by design description. Finally, a set of advice items relevant to the use of the error mechanism has been represented and indexed by design description and design decision. These advice items are labelled as either primary or secondary; some are labelled as overriding; and owners of the advice items are stored.

A design assistant was created which uses the algorithm shown in FIG. 3 to obtain information from the designer. The design assistant then uses the algorithm shown in FIG. 5 to compute the advice relevant to the design being constructed. The advice is presented to the designer and a trace of the interaction of the designer with the design assistant is produced. This trace becomes part of the design document as described in this application. FIG. 6 illustrates a Partial Trace 601 of this system. DKT problem question 603 is presented to the user. If the user response is "yes", then Design Advice 605 is presented to the user, consisting of Primary Advice 607 and secondary advice 609.

CONCLUSION

The foregoing Detailed Description has disclosed to those skilled in the arts to which the invention pertains how one may make and use a system for delivering design advice and evolving the knowledge base from which the advice is generated. Other techniques that those disclosed herein for practicing the invention and other areas in which the invention may be applied will be apparent to those skilled in the arts concerned after reading the foregoing disclosure. For example, CLASSIC could be replaced by other representation languages.

In addition, while the interaction of the Design Assistant and the designer described here is based on the Design Assistant asking a question, getting the designer's answer, then acting on the basis of the answer, other methods of interaction would be even more appropriate in other circumstances. For example, if the Design being produced is a formal object, the Design Assistant could apply rules of inference directly to the design in order to classify it, rather than querying the designer. Further, advice could be delivered in many different ways, for example, combinations of text, graphics, video, etc.

Because of the wealth of the possible embodiments of the invention, the foregoing Detailed Description is to be understood as being in every respect illustrate and exemplary, but not restrictive, and the scope of the invention disclosed herein is not to be determined from the Detailed Specification, but rather from the claims as interpreted in light of the Detailed Description and in accordance with the doctrine of equivalences.

What is claimed is:

1. Apparatus for providing advice about a design, the apparatus comprising:
    a design document;
    a knowledge base from which information about a domain relevant to the design is obtainable in response to a query; and
    design assistant means for providing an annotation including the advice for the design document, the design assistant means including
    query providing means for producing the query in response to a specification of an advice area received from a user and providing the query to the design assistant means for execution on the knowledge base and
    advice providing means responsive to the information produced in response to the execution of the query for employing the information to provide the annotation.

2. The apparatus set forth in claim 1 wherein:
    the information has an owner; and
    the annotation includes data indicating the owner of the information employed in providing the advice.

3. The apparatus set forth in claim 1 wherein:
    the advice providing means further includes means for permitting the user to indicate that the user has not accepted the advice; and
    the advice providing means further includes an indication that the user has not accepted the advice in the annotation.

4. The apparatus set forth in claim 1 further comprising:
    means for updating the knowledge base with additional information based on a review of the annotation by a party interested in the design.

5. The apparatus set forth in claim 1 wherein:
    the knowledge base includes
    a hierarchy of design descriptions,
    a set of design decisions indexed by design descriptions, and
    a set of advice items indexed by design decision and design description;
    and
    the design assistant means executes the query by locating a design description corresponding to the advice area, locating a design decision indexed by the design description, locating an advice item indexed by the located design description and the located design decision, and obtaining the located advice item.

6. The apparatus set forth in claim 5 wherein:
    at least one of the design descriptions has an establishing question associated therewith; and
    the query providing means provides the establishing question to the user; and
    the user provides the specification of the advice area by providing an answer to the establishing question to the query providing means.

7. The apparatus set forth in claim 5 wherein:
    the advice items include an overriding advice item; and
    when the design assistant means locates both an overriding advice item and another advice item which is not an overriding advice item, in executing the query, the design assistant means responds to the overriding advice item by obtaining the overriding advice item as the located advice item.

8. The apparatus set forth in claim 7 wherein:
    the apparatus further includes
    means for updating the knowledge base; and
    the means for updating the knowledge base updates the knowledge base with additional information based on a review of the annotation which includes an indication of whether an advice item is overriding.

9. The apparatus set forth in claim 5 wherein:
    the advice items include primary advice items and secondary advice items and
    the knowledge base further includes labels which indicate whether a located advice item is a primary advice item or a secondary advice item;
    and
    the advice providing means responds to a label by indicating whether the provided advice is primary or secondary advice.

* * * * *